US008196547B2

(12) United States Patent
Liu et al.

(10) Patent No.: US 8,196,547 B2
(45) Date of Patent: Jun. 12, 2012

(54) ANIMAL POTTY CHAIR

(76) Inventors: Devin Ru Liu, Downingtown, PA (US);
James Zhou Liu, Downingtown, PA (US)

( * ) Notice: Subject to any disclaimer, the term of this patent is extended or adjusted under 35 U.S.C. 154(b) by 83 days.

(21) Appl. No.: 12/371,013

(22) Filed: Feb. 13, 2009

(65) Prior Publication Data

US 2010/0206244 A1    Aug. 19, 2010

(51) Int. Cl.
*A01K 29/00* (2006.01)
(52) U.S. Cl. .......................................... 119/162; 119/163
(58) Field of Classification Search .......... 119/161–163, 119/165, 712, 719; 4/300, 420, 661
See application file for complete search history.

(56) References Cited

U.S. PATENT DOCUMENTS

| 2,584,656 | A | * | 2/1952 | Anderson | 119/162 |
| 3,601,093 | A | * | 8/1971 | Cohen | 119/162 |
| 4,231,321 | A | * | 11/1980 | Cohen | 119/162 |
| 4,748,700 | A | * | 6/1988 | Wooten | 4/661 |
| 5,027,451 | A | * | 7/1991 | Wooten et al. | 4/661 |
| 5,117,780 | A | * | 6/1992 | Wooten et al. | 119/162 |
| 5,216,979 | A | * | 6/1993 | Sallee et al. | 119/162 |

* cited by examiner

*Primary Examiner* — Rob Swiatek
*Assistant Examiner* — Ebony Evans

(57) ABSTRACT

An animal potty chair, particularly for a dog or cat, is to be used indoor and/or outdoor to aid civilization of domestic animals and to improve quality of life for millions of families with animals. The animal potty chair comprising: (1) a defined space with a surrounding wall-like structure with a one-way entry and one-way exit mean for an animal to release waste to a designated area without leakage to the outside of the top part of the potty chair; (2) a downwards operable mesh surface of the potty chair for an animal to stand on safely and to release waste within a protective space; (3) a fitting-sealing-fixing adaptor between the potty chair and a toilet, which is to fix the potty chair onto the toilet and to prevent leakage of the animal waste; (4) an easy cleaning container for holding animal waste, and (5) a signal system comprising a trigger mean to open the mesh and to flush the toilet by an animal with its body weight. The method on how to use the animal potty chair is also presented. The current invention helps to cause a revolutionary transformation of a pet from an accident-causing animal to a civilized non-human member of the family. The smell of the animal waste is reduced dramatically after the animal gets acquainted with using the current invention of an animal potty chair.

10 Claims, 3 Drawing Sheets

An Animal Potty Chair

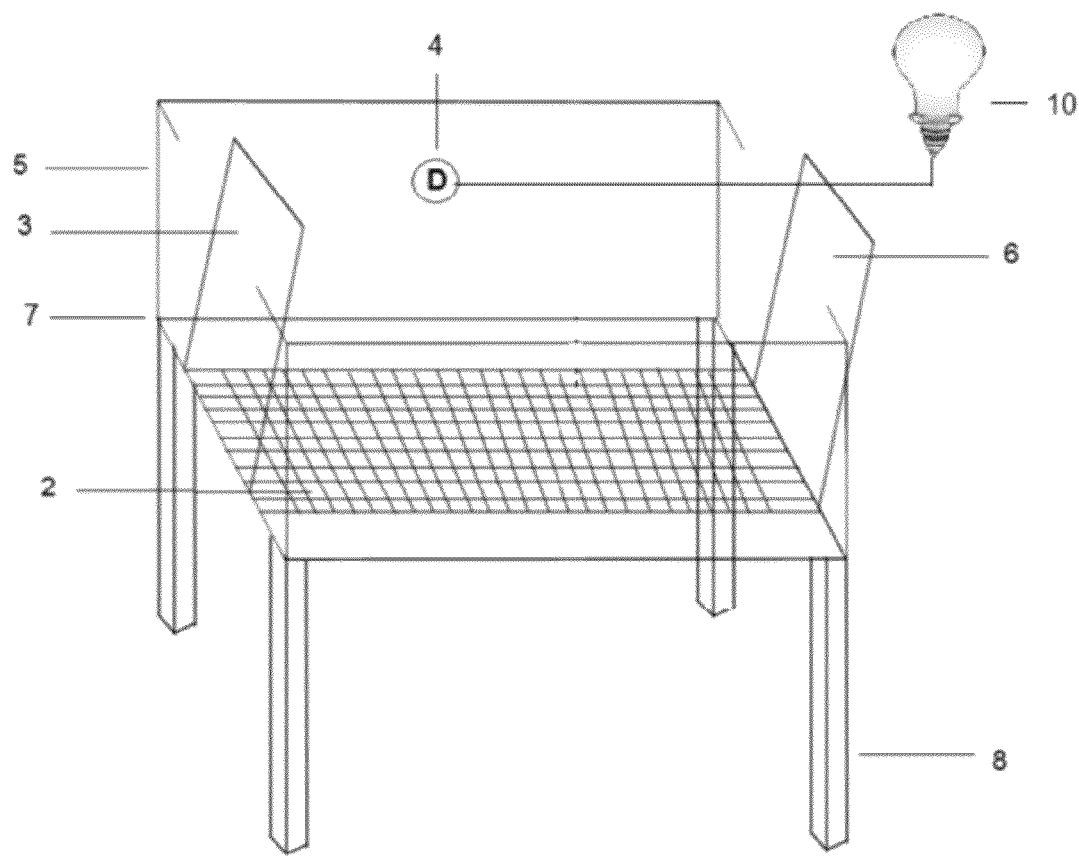
Figure 1. The Top Part of an Animal Potty Chair

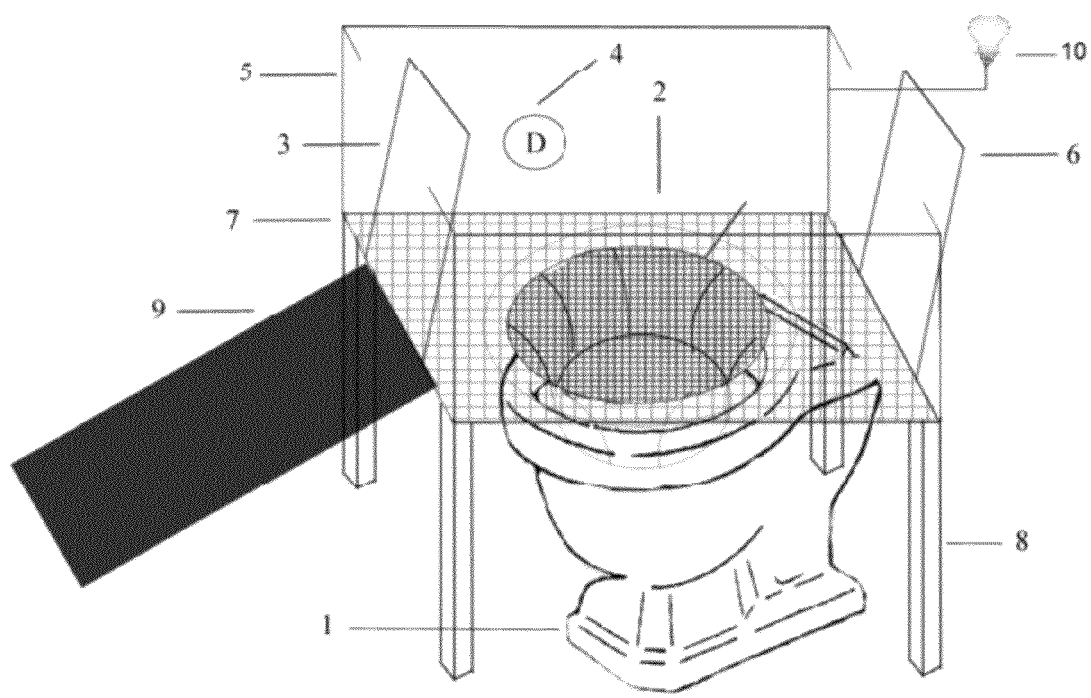
Figure 2. An Animal Potty Chair

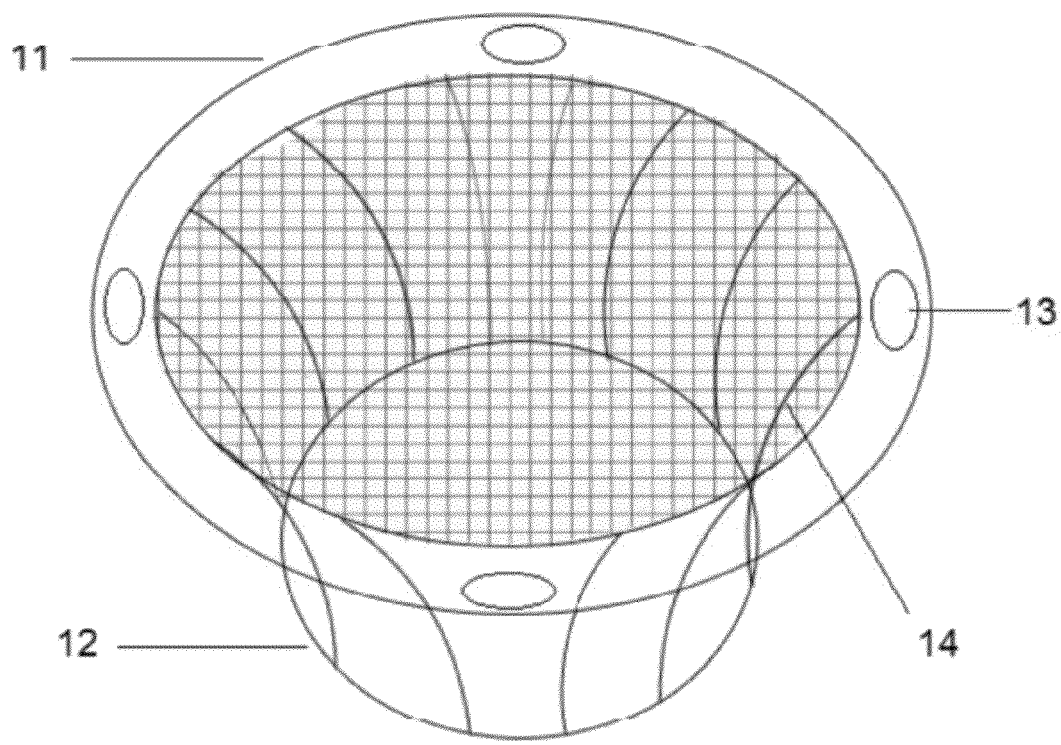
Figure 3. A Seal-Fixation Adaptor

ANIMAL POTTY CHAIR

TECHNICAL FIELD OF THE INVENTION

The present invention relates to an animal potty chair, particularly for a dog or cat, to be used indoor and/or outdoor to aid civilization of domestic animals and to improve quality of life for millions of families with animals.

BACKGROUND OF THE INVENTION

Dogs and cats are wonderful creatures and very popular companions for the pet owners and families. They protect the owner's home and family. However, every time the animal eats or drinks, waste metabolites will be generated and released. The owner must be responsible for the waste clean-up of house-bound pets. Even though many pets are trained, there can be inadvertent accidents. It would be especially bad during the hot summers or cold winter to remove animal waste from the house. The smell could be stifling for family members. The urine smell could be strong enough that it would be embarrassing for the family to bring guests over.

It is common for the animal to accidently release waste at any area in the house. It is desirable to clean pet messes as quickly and thoroughly as possible. When the waste is on the carpet, it takes effort to identify the odiferous areas of the carpet. Sometimes black-light source detection is needed to identify dried urine spots. For deep-cleaning the problem areas, one must use a steam carpet-cleaning machine or a carpet-shampoo machine, not a typical vacuum. Other times, one must use an enzymatic pet odor-neutralizing powder on the affected areas. Many other efforts must be taken to remove pet-odor.

Cleaning urine and feces of the pet is an unpleasant but essential task of pet ownership. This task is particularly burdensome for those who live in tall apartment buildings, or travel with their pets. It is desirable to have a device for preventing a pet from touching the waste in order to keep house floor clean. Many pet owners have trained the pet to go outside for releasing waste metabolites. However, the family member may find it very inconvenient in scheduling to let their pets out and/or take them on walks for toilet purposes, or in the case of airports—impossible. If one is delayed in going back home due to a variety of reasons, the animal, after experiencing a long period of stress, may have to release the waste in the house and cause a number of issues. Similarly, travel delays could strand a pet for hours inside of the airport. For maintaining a civilized life, a pet needs a functional toilet. The owner family will ultimately receive a number of benefits like (1) less involvement in cleaning waste materials; (2) ease in maintaining a clean house; (3) less worry that their pet would cause an accident if a functional toilet were to be provided.

Currently, a number of animal toilets are available. Wiz-Dog Indoor Potty System for Dogs is a plastic tray covered with a mesh. This device is very useful for collecting urine and largely prevents wet paw tracking throughout the house. It is a simple and low-cost pet toilet in the house. However, when the pet is not standing in the right position on the device, quite often, urine or feces can fall outside of the collecting tray. To ensure the accuracy for waste materials to fall within the tray, the pet needs a guide. Hence, the device needs to be improved. The current invention will resolve this issue.

An animal litter disclosed by Takeshi et al. (U.S. Pat. No. 7,467,600) comprises a plurality of granular materials having water-shedding properties and second granular material having liquid-absorbing properties. Although this system has advantages, the granular materials can easily be brought to the house floor by an animal. Therefore, a better device for indoor use needs to be developed.

Other prior art devices for collecting pet waste are shown in the Gloor U.S. Pat. No. 7,434,539; Dennis U.S. Pat. No. 4,117,555; the Clark U.S. Pat. No. 4,979,469 and the Hochman U.S. Patent Publication No. 2004/0011297. Although each of those prior arts is uniquely useful, there is no mean for a dog or cat to use a human toilet. An ideally-functional animal toilet needs to be developed.

Other prior art devices for training animal, for giving animal a beauty looking, and others, cited here, U.S. Pat. No. 7,467,600 December 2008 Ikegami; U.S. Pat. No. 7,481,021, January 2009 Riddell; U.S. Pat. No. 7,464,668 December 2008 Brewington; U.S. Pat. No. 7,395,784 July 2008 Hirokawa; U.S. Pat. No. 7,434,539 October 2008, Gloor; U.S. Pat. No. 7,373,673 May 2008 Holland; U.S. Pat. No. 7,479,889 January 2009 Kazdin; U.S. Pat. No. 7,444,959 November 2008 Hensley, are very useful for the designed purposes, but all cannot meet the toilet need of a civilized animal.

Cohen disclosed an animal toilet in his U.S. Pat. No. 3,601,093. However, he failed to provide a defined space for an animal to open and leave freely. The device taught by Cohen is a cage. The animal owner has to open and close the cage for an animal to release waste materials. His invention has so many small pieces and is very hard to put onto the human toilet for animal to use. It would take a lot effort to assembly or disassembly the device taught by Cohen in his #093 patent. In addition, Cohen's device used a mat, not washable by flushing the toilet. Therefore, Cohen's invention requires a significant amount of direct efforts from the animal's owner. Cohen disclosed an animal toilet in his Ser. No. 04/231,321. However, he failed to provide a defined space for an animal safety stand within. The space taught by Cohen is an open area without any boundary. There is a risk for an animal to fall out of the open space. The device taught by Cohen is specifically used by an animal. In many families, that creates a rather difficulty since not many family can have a dedicated toilet for animals. It would take a lot effort to assembly or disassembly the device taught by Cohen in his #321 patent. Cohen taught an extended downwardly through the opening of the seat or through the opening of the porcelain basin and preventing horizontal displacement of the support space thereupon. This is an extension, not a sealer, not an adaptor. Therefore, this apparatus cannot prevent leakage of the waste material.

Wooten disclosed a wall-surrounded space in his Ser. No. 04/748,700. However, there was lack of a defined one-way entry and one-way exit design for the animal to enter and exit in the same direction within the provided space. In Wooten's space, an animal can move to any direction, which can cause randomly touching and spreading fecal materials. One of the important purposes of the animal toilet is to prevent animal to spread waste materials. Therefore, there is a real need to have a more functional device.

BRIEF DESCRIPTION OF THE DRAWINGS

FIG. 1 is an upper, front left side perspective view of the top of an animal potty chair embodying present inventions, showing a mesh covered tray with surrounding walls and doors. This will ensure the animal will release urine or feces only onto the mesh within a defined space.

FIG. 2 is an upper, front, left side perspective view of an animal potty-chair for forming an animal toilet embodying the present invention, showing a mesh-covered chair surface with surrounding sides, a sensor linked to a light as a signal triggered after an animal is standing on the potty-chair and after leaving the potty chair. This ensures the animal release urine or feces within the defined space into the area covered with a mesh. When this potty-chair is placed on the top of a human toilet through a fitting-sealing-fixing adaptor, pet's urine and feces will flow or drop into toilet from the mesh after the animal leaves the potty chair. When this potty-chair is placed on the top of a container, pet's urine and feces will flow or drop into the container.

FIG. 3 is a toilet fitting-sealing-fixing adaptor. This apparatus is to seal the connection between the surrounding edge of the potty-chair seating surface (below the mesh) and the top space of the human toilet to prevent animal waste from flowing or dropping to outside of the toilet. It also prevents moving away of the potty chair from the top of the human toilet.

DETAILED DESCRIPTION OF THE PRESENT INVENTION

As required by the patent regulation, detailed embodiments of the present invention are disclosed herein. However, it is to be understood that the disclosed embodiments are merely examples of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Embodiment of the Invention

FIG. 1 is a top part of an animal potty chair embodying the present invention. Without limitation on the generality of useful applications of the animal toilet, an exemplary application, described herein, is for receiving, storing and discharging waste from domestic animals, such as cats and dogs. The top part of an animal toilet shown in FIG. 1 has a mesh top 2, an inwards door 3, a sensor 4, an outwards door 6, a supporting frame (7 and 8) and guiding walls (5) around the waste receiving unit. The animal can enter into the toilet from any direction, but preferentially from one direction enforced by a pair of one-directional entrance (3) and exit (6). The waste collection unit is covered with a mesh (2). The entire apparatus is scalable and thereby adaptable for animals and toilets of various sizes. Any safe materials can be used to manufacture this animal toilet, such as plastic, metal, wood, or in any combination.

The mesh (2) can let urine flow down to toilet easily but strong enough to support an animal. The mesh can be made in one, two or more pieces. When the two pieces of mesh are separated horizontally, the fecal material easily drops down to the container or toilet in the centrally opened space after the animal leaves the potty chair. In another design, the mesh can have an appropriate open to make it easy for the pet owner to put feces into toilet.

The entrance of the animal toilet is formed by a door 3 which can be opened in either direction. When it opens outwards, the door itself will function as a ramp, which can eliminate the need to have an additional ramp. The entrance of the animal toilet is also formed by the door 3 which can only open inwards. This will force the animal to precisely release waste at a specific standing position by heading to the exit 6 only. The sidewalls 5 keep the animal within the toilet space and to release waste materials only onto the mesh top (2). The exit 6 of the animal toilet can only open outwards, which is to reinforce what the animal learned on how to enter, use and leave its toilet. This foldable door can function as a ramp for an animal to walk out the potty chair and to trigger the toilet flushing when the animal stands on it. It is very easy to assembly the one-directional doors by using any means, such as a spring fixed on the doors and frame of the wall.

A sensor 4 is linked with a signal device, like a nightlight or a flashing light placed in a place easy for a person to observe, to call attention of the person in the house to come to the animal toilet to do a simple cleaning. This sensor is triggered by any means, such as the weight when the animal is standing on the mesh top or on the ramp. Timely cleaning of the animal waste on the mesh helps to reduce the concentration of any unpleasant smell materials in the house. It also helps to prevent contact with fecal material when the animal re-uses the toilet.

FIG. 2 shows an assembled potty-chair for an animal to use human toilet when this apparatus is placed onto the top of human toilet (1). It comprises of those essential parts as shown in FIG. 1: the supporting frame 7 and 8, the mesh top 2, the surrounding sidewalls 5, the sensor 4, and the signal 10. The one or two stairs in front of the chair is not shown, or the ramp is formed by the entrance door 3 when is opened outwards, as the stairs may not be needed if the potty-chair is relatively accessible for the animal to jump upon, especially a big dog. This space may only have one entrance if the overall space of the human toilet is limited. If space is not a restrictive issue, the one-directional doors shown in FIG. 1 should be assembled. For the one-entrance potty-chair, the surrounding walls 5 are needed to ensure that the animal discharge its waste within the target area—the mesh top 2. The mesh top can be made with one, two or more pieces, and can have an appropriate-sized hole/open to let the feces drop down. The owner should train the animal not to turn the body around after entering the toilet, and to face out before releasing its waste. The overall size of the potty chair varies to meet the special need for a cat, a small dog, or a big dog, as well as for fitting onto the human toilet.

If the potty chair is used without a human toilet, the receptacle base 1 can be any waste container. The container can be either dry or can be filled with a functional liquid, such as deodorant, or disinfectant.

FIG. 3 is a potty chair fitting-sealing-fixing adaptor. This apparatus is to tightly fit into and to seal the toilet top which is assembled directly under the seat of the potty-chair. This apparatus can also be an integral part of the potty-chair. Any safe material can be used to manufacture this apparatus, such as plastic or rubber. This apparatus can be hard, soft, or in between. It can be in a funnel shape formed with a wider open 11 on the top and a narrow open 12 at the bottom, through the gradual curve shaped mean 14, or in any other shape to loosely or tightly fit into the open-top of the toilet. This fitting-sealing-fixing adaptor can also secure that the position of the potty chair on the top of toilet will not be changed after many uses by an animal. This fitting-sealing-fixing adaptor can be made separately from the potty chair and to be fixed onto by using screws 13, or can be made as an integral part of the potty chair.

The current invention can be used to cause a revolutionary transformation of a pet from an accident-causing animal to a civilized non-human member of the family. There will be no more wet urine paw tracks left anywhere in the owner's house. Solid wastes stay on the top of the mesh, semi-liquid or loose feces fall into the toilet, or may be washed away by toilet flushing triggered by an animal's weight. The owner only needs to do minimal housekeeping, much easier than taking care of a human baby. The smell of the animal waste is reduced dramatically after the animal gets acquainted with using the current invention of an animal toilet.

EXAMPLE 1

This example illustrates how a small dog has been trained to use its toilet disclosed in FIG. 2. Before the toilet was available, the small puppy had been trained to wait for his owner to come home, then to go out of the house to release waste. Frequently, this small dog could not hold wastes for that long and released urine or feces inside the house. Whenever this happened, the owner took a lot of effort to clean the carpet and other places. After suffering from this frustration many times, the owner designed a new toilet and started to train his small dog in the backyard. Whenever the dog had a toilet need, the owner brought the dog to the newly designed toilet. The dog was smart enough to use his head to open the uni-directional door after the owner showed how to do it, then stood on the top of mesh to release urine. Afterwards, the dog tried to go out by pushing on various places of the wall and finally opened the one-directional exit door for going out. The owner then trained the dog to release feces the same way outside of the house. After the dog was able to do both outdoors, the owner trained the dog to release urine and feces in the house. Afterwards, the owner is less pressured to hurry home after school and work to take care of his little dog.

EXAMPLE 2

This example illustrates how a small dog has been trained to use the potty-chair to release waste to a human toilet disclosed in FIG. 2. After the owner successfully trained the dog using the animal toilet described in example 1, the owner had to do a lot cleaning after the animal released waste. The owner then designed a special potty-chair by replacing the flat-seat surface with a mesh. Because the dog is a small one, the owner placed a plastic stool before the potty-chair. When the dog expressed elimination needs, the owner placed the potty-chair on the top of a human toilet. The little dog urinated after standing on the top of the potty-chair and all urine drained into the toilet through the mesh. The owner only used water to rinse the mesh. When the owner observed the water leakage to outside of the toilet, he made a toilet seal-fixation adaptor and placed it onto the top of the toilet, and let the potty-chair seal tightly on the toilet through the seal-fixation adaptor. This seal-fixation adaptor completely prevented water leakage. The next time when the dog expressed an elimination desire, the owner brought the dog to the potty-chair again. The dog discharged feces onto the top of the potty-chair. The owner separated the two pieces of the mesh to let the feces drop to the toilet. Then, the mesh was rinsed with water and placed back to the seat of the potty-chair. After a few times of training, the small dog could do those things easily at any time during the day and night. Although the owner has to do minimal cleaning after his dog released waste, the newly designed potty-chair significantly saved his time. His puppy does not need to wait for the entire day to release urine or feces while the owner's family members are at work or at school. The animal expresses less stress and the owner's family no longer has to deal with elimination accidents within the house.

EXAMPLE 3

The owner of the small dog in Example 2 tried to know as soon as possible after his dog released waste after using the potty-chair placed on the top of a human toilet. He placed a weight-triggered sensor under the entry part of the mesh. When the animal jumped onto the potty-chair, a flashing light in the hallway was turned on. After the dog left the bathroom, the owner walked in the bathroom to check if any cleaning work was needed. Most times, the owner just used a water-sprayer to rinse the mesh. With the sensor and the flashing light, the owner could timely take care of the animal waste with a minimum effort. The house therefore was maintained at a lower level of animal waste smell.

EXAMPLE 4

This example illustrates how a cat had been trained to release waste to a human toilet through using a potty-chair disclosed in FIG. 2. After the owner of the small dog happily trained his dog in example 2, he made another potty-chair and gave to his relative family who has a cat. The owner of the cat placed a plastic stool before the potty-chair, and taught the cat to come to the potty-chair to release waste. At the beginning, a piece of the cooked fish was placed into a stainless steel mesh infuser ball. The ball was tightly fixed to the back of the potty-chair. This made it very easy for the cat to come to the potty-chair. It took only two days for the cat's owner to train the cat to use the potty-chair placed on the top of a human toilet to release waste. After this training, the cat's owner and family members have been enjoying a clean house without doing much cleaning work.

Numerous pet owners now have a simple and reliable method to let the dog or cat to live freely in the house with a minimum cleaning effort.

INDUSTRIAL APPLICABILITY

Through the convenient use of the animal potty chair of this invention, pet owners now have a simple, safe, removable and inexpensive apparatus that can be used to improve their pets' and their own quality of life, and to free them from cleaning animal wastes scattered around the house. Numerous pet owners will greatly benefit from using the new animal potty chair disclosed herein.

Those skilled in the art will appreciate that changes and modifications can be made to the apparatus, and the methods of use disclosed herein without departing from the spirit and scope of the present invention as set forth as defined by the following claims.

What is claimed is:
1. A removable animal potty chair comprising:
   a defined space with a framed wall supported with legs with a one-way entry door and one-way exit door for an animal to release waste matter to a designated area without leakage to the outside of the space;
   a downward-opening mesh surface fixed at the base of said framed wall of the potty chair for an animal to stand on safely and to release waste matter within a protective space, and triggered to release the waste matter into the toilet upon an animal stepping on a suspended surface outside of the one-way exit door of the potty chair;
   a fitting-sealing-fixing adaptor connecting tightly with the base of said framed wall of the potty chair into the inside or outside of the top-edge of a toilet after opening its seat and cover lid, and fixing the potty chair onto the toilet without moving to any direction and to prevent leakage of the animal waste matter;

a signal system comprising a toilet flushing trigger connecting to said suspended surface outside of the exit door of the potty chair, onto which an animal stepping on will cause the toilet to flush.

2. The animal potty chair in accordance with claim 1, wherein said defined space is the top part of the potty chair formed with said framed wall with the one-way entry door and one-way exit door to provide an animal a protective space to stay in precisely when releasing waste matter, and the one-way entry door and one-way exit door can be operated with the forward moving of an animal's head.

3. The animal potty chair in accordance with claim 1, wherein said downward-opening mesh surface of the potty chair is a strong and easy-clean mesh for an animal to safely stand on when releasing waste matter within a protective space, and triggered to release waste matter the toilet upon an animal stepping on said suspended surface outside of the potty chair exit door.

4. The animal potty chair in accordance with claim 1, wherein said fitting-sealing-fixing adaptor is an apparatus to fit into and to seal the entire top edge of the toilet with fully opened seat and cover lid to prevent leakage of any waste matter to outside of the toilet, and to fix the potty chair into the toilet to prevent the potty chair from moving to any direction.

5. The animal potty chair in accordance with claim 1, wherein said signal system comprising the toilet flushing trigger is a mechanical apparatus and the animal's body weight is the force to trigger the system; this trigger connecting to said suspended surface outside of the exit door of the potty chair, to which an animal stepping on will cause the toilet to flush.

6. A method of using a removable animal potty chair as claimed in claim 1 to increase civilization of a domestic animal comprising the following steps:
(1) fully opening a human toilet seat and cover lid, placing the removable animal potty chair tightly into the top of a human toilet;
(2) placing a toilet flushing trigger system in a working status;
(3) training an animal to use the removable animal potty chair by entering the potty chair from a one-way entry door and leaving the potty chair at a one-way exit door;
(4) cleaning the removable animal potty chair whenever it is needed;
(5) removing the animal potty chair aside when a human needs to use the toilet.

7. The method of using a removable animal potty chair in accordance with claim 6, wherein said placing the removable animal potty chair tightly onto the human toilet can be done by anyone who has that capacity.

8. The method of using a removable animal potty chair in accordance with claim 6, wherein said cleaning the removable animal potty chair can be done by anyone who has that capacity.

9. The method of using a removable animal potty chair in accordance with claim 6, wherein said domestic animal is a dog.

10. The method of using a removable animal potty chair in accordance with claim 6, wherein said domestic animal is a cat.

* * * * *